(12) United States Patent
Abe et al.

(10) Patent No.: US 11,089,224 B2
(45) Date of Patent: Aug. 10, 2021

(54) IMAGING APPARATUS

(71) Applicant: Panasonic Intellectual Property Management Co., Ltd., Osaka (JP)

(72) Inventors: Mitsuo Abe, Osaka (JP); Manabu Watanabe, Osaka (JP); Kyosuke Osuka, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 16/932,716

(22) Filed: Jul. 18, 2020

(65) Prior Publication Data

US 2021/0029301 A1    Jan. 28, 2021

(30) Foreign Application Priority Data

Jul. 22, 2019    (JP) .............................. JP2019-134573

(51) Int. Cl.
*H04N 5/232*    (2006.01)

(52) U.S. Cl.
CPC ... *H04N 5/232941* (2018.08); *H04N 5/23245* (2013.01); *H04N 5/232933* (2018.08)

(58) Field of Classification Search
CPC ......... H04N 5/23245; H04N 5/232933; H04N 5/232941
See application file for complete search history.

(56) References Cited

U.S. PATENT DOCUMENTS

| 5,416,534 | A | * | 5/1995 | Hayashi | .................... | H04N 5/57 |
| | | | | | | 348/678 |
| 8,988,554 | B2 | * | 3/2015 | Ohnishi | ................. | G11B 27/34 |
| | | | | | | 348/231.1 |
| 2001/0048472 | A1 | * | 12/2001 | Inoue | ............... | H04N 5/232939 |
| | | | | | | 348/207.99 |
| 2010/0194963 | A1 | * | 8/2010 | Terashima | ........... | H04N 1/2112 |
| | | | | | | 348/333.11 |
| 2015/0373258 | A1 | * | 12/2015 | Chuang | .............. | H04N 5/23222 |
| | | | | | | 348/333.04 |
| 2018/0220189 | A1 | * | 8/2018 | Hodge | ............... | G11B 20/0021 |

FOREIGN PATENT DOCUMENTS

| JP | 2001-346075 A | 12/2001 |
| JP | 2004-126007 A | 4/2004 |
| JP | 2008-054228 A | 3/2008 |

\* cited by examiner

*Primary Examiner* — Amy R Hsu
(74) *Attorney, Agent, or Firm* — Renner, Otto, Boisselle & Sklar, LLP

(57) ABSTRACT

An imaging apparatus having a plurality of video modes for capturing videos with respective video quality, the imaging apparatus comprising: a display that displays information indicating the plurality of video modes; an operation receiver that receives a user operation for designating a video mode in the plurality of video modes based on the displayed information; and a controller that sets the video mode designated via the operation receiver for the imaging apparatus. Each of the video modes has elements corresponding to items associated with the video quality. Combinations of the elements of different items are limited in the plurality of video modes. The controller receives, via the operation receiver, a user operation for setting a refining condition associated with at least one of the items, and refines, from the plurality of video modes, a video mode to be displayed on the display in accordance with the set refining condition.

9 Claims, 19 Drawing Sheets

Fig. 3

VIDEO MODE OVERALL TABLE

| ID | NUMBER OF PIXELS | FRAME RATE | COMPRESSION METHOD | VFR AVAILABILITY | HLG AVAILABILITY |
|---|---|---|---|---|---|
| 1 | 6K(3:2) | 23.98p | 420/10bit Long GOP | UNAVAILABLE | AVAILABLE |
| 2 | 5.4K(3:2) | 29.97p | 420/10bit Long GOP | UNAVAILABLE | AVAILABLE |
| 3 | 5.9K(16:9) | 29.97p | 420/10bit Long GOP | UNAVAILABLE | AVAILABLE |
| 4 | C4K(17:9) | 59.94p | 420/10bit Long GOP | UNAVAILABLE | AVAILABLE |
| 5 | C4K(17:9) | 59.94p | 420/8bit Long GOP | AVAILABLE | UNAVAILABLE |
| 6 | C4K(17:9) | 29.97p | 422/10bit ALL-Intra | UNAVAILABLE | AVAILABLE |
| 7 | C4K(17:9) | 29.97p | 422/10bit Long GOP | UNAVAILABLE | AVAILABLE |
| 8 | C4K(17:9) | 29.97p | 420/8bit Long GOP | AVAILABLE | UNAVAILABLE |
| 9 | C4K(17:9) | 23.98p | 422/10bit ALL-Intra | UNAVAILABLE | AVAILABLE |
| 10 | C4K(17:9) | 23.98p | 422/10bit Long GOP | UNAVAILABLE | AVAILABLE |
| 11 | C4K(17:9) | 23.98p | 420/8bit Long GOP | AVAILABLE | UNAVAILABLE |
| 12 | 4K(16:9) | 59.94p | 420/10bit Long GOP | UNAVAILABLE | AVAILABLE |
| 13 | 4K(16:9) | 59.94p | 420/8bit Long GOP | AVAILABLE | UNAVAILABLE |
| 14 | 4K(16:9) | 29.97p | 422/10bit ALL-Intra | UNAVAILABLE | AVAILABLE |
| 15 | 4K(16:9) | 29.97p | 422/10bit Long GOP | UNAVAILABLE | AVAILABLE |
| 16 | 4K(16:9) | 29.97p | 420/8bit Long GOP | AVAILABLE | UNAVAILABLE |
| 17 | 4K(16:9) | 23.98p | 422/10bit ALL-Intra | UNAVAILABLE | AVAILABLE |
| 18 | 4K(16:9) | 23.98p | 422/10bit Long GOP | UNAVAILABLE | AVAILABLE |
| 19 | 4K(16:9) | 23.98p | 420/8bit Long GOP | AVAILABLE | UNAVAILABLE |
| 20 | FHD(16:9) | 59.94p | 422/10bit ALL-Intra | UNAVAILABLE | AVAILABLE |
| 21 | FHD(16:9) | 59.94p | 422/10bit Long GOP | UNAVAILABLE | AVAILABLE |
| 22 | FHD(16:9) | 59.94p | 420/8bit Long GOP | AVAILABLE | UNAVAILABLE |
| 23 | FHD(16:9) | 59.94i | 422/10bit ALL-Intra | UNAVAILABLE | AVAILABLE |
| 24 | FHD(16:9) | 59.94i | 422/10bit Long GOP | UNAVAILABLE | AVAILABLE |
| 25 | FHD(16:9) | 29.97p | 422/10bit ALL-Intra | UNAVAILABLE | AVAILABLE |
| 26 | FHD(16:9) | 29.97p | 422/10bit Long GOP | UNAVAILABLE | AVAILABLE |
| 27 | FHD(16:9) | 29.97p | 420/8bit Long GOP | AVAILABLE | UNAVAILABLE |
| 28 | FHD(16:9) | 23.98p | 422/10bit ALL-Intra | UNAVAILABLE | AVAILABLE |
| 29 | FHD(16:9) | 23.98p | 422/10bit Long GOP | UNAVAILABLE | AVAILABLE |
| 30 | FHD(16:9) | 23.98p | 420/8bit Long GOP | AVAILABLE | UNAVAILABLE |

Fig. 4

| VIDEO SHOOTING AREA CHECK TABLE | | | |
|---|---|---|---|
| ID | FULL SIZE AREA | S35 AREA | PIXEL BY PIXEL AREA |
| 1 | AVAILABLE | UNAVAILABLE | UNAVAILABLE |
| 2 | AVAILABLE | UNAVAILABLE | UNAVAILABLE |
| 3 | AVAILABLE | UNAVAILABLE | UNAVAILABLE |
| 4 | UNAVAILABLE | AVAILABLE | AVAILABLE |
| 5 | UNAVAILABLE | AVAILABLE | AVAILABLE |
| 6 | AVAILABLE | AVAILABLE | AVAILABLE |
| 7 | AVAILABLE | AVAILABLE | AVAILABLE |
| 8 | AVAILABLE | AVAILABLE | AVAILABLE |
| 9 | AVAILABLE | AVAILABLE | AVAILABLE |
| 10 | AVAILABLE | AVAILABLE | AVAILABLE |
| 11 | AVAILABLE | AVAILABLE | AVAILABLE |
| 12 | UNAVAILABLE | AVAILABLE | AVAILABLE |
| 13 | UNAVAILABLE | AVAILABLE | AVAILABLE |
| 14 | AVAILABLE | AVAILABLE | AVAILABLE |
| 15 | AVAILABLE | AVAILABLE | AVAILABLE |
| 16 | AVAILABLE | AVAILABLE | AVAILABLE |
| 17 | AVAILABLE | AVAILABLE | AVAILABLE |
| 18 | AVAILABLE | AVAILABLE | AVAILABLE |
| 19 | AVAILABLE | AVAILABLE | AVAILABLE |
| 20 | AVAILABLE | AVAILABLE | AVAILABLE |
| 21 | AVAILABLE | AVAILABLE | AVAILABLE |
| 22 | AVAILABLE | AVAILABLE | AVAILABLE |
| 23 | AVAILABLE | AVAILABLE | AVAILABLE |
| 24 | AVAILABLE | AVAILABLE | AVAILABLE |
| 25 | AVAILABLE | AVAILABLE | AVAILABLE |
| 26 | AVAILABLE | AVAILABLE | AVAILABLE |
| 27 | AVAILABLE | AVAILABLE | AVAILABLE |
| 28 | AVAILABLE | AVAILABLE | AVAILABLE |
| 29 | AVAILABLE | AVAILABLE | AVAILABLE |
| 30 | AVAILABLE | AVAILABLE | AVAILABLE |

| CONDITION ITEM | CONDITION VALUE |
|---|---|
| FRAME RATE | ALL |
| NUMBER OF PIXELS | ALL |
| COMPRESSION METHOD | ALL |
| VFR AVAILABILITY | ALL |
| HLG AVAILABILITY | ALL |

Fig. 5B

| ID | GRAYOUT |
|---|---|
| 1 | NO |
| 2 | NO |
| 3 | NO |
| 4 | YES |
| 5 | YES |
| 6 | NO |
| 7 | NO |
| 8 | NO |
| 9 | NO |
| 10 | NO |
| 11 | NO |
| 12 | YES |
| 13 | YES |
| 14 | NO |
| 15 | NO |
| 16 | NO |
| 17 | NO |
| 18 | NO |
| 19 | NO |
| 20 | NO |
| 21 | NO |
| 22 | NO |
| 23 | NO |
| 24 | NO |
| 25 | NO |
| 26 | NO |
| 27 | NO |
| 28 | NO |
| 29 | NO |
| 30 | NO |

*Fig. 6*

| REFINING CONDITION CANDIDATE TABLE | | | D5 |

| D5a<br>NUMBER OF PIXELS | D5b<br>FRAME RATE | D5c<br>COMPRESSION METHOD |
|---|---|---|
| ALL | ALL | ALL |
| 6K(3:2) | 59.94p | 422/10bit ALL-Intra |
| 5.4K(3:2) | 59.94i | 422/10bit Long GOP |
| 5.9K(16:9) | 29.97p | 420/10bit Long GOP |
| C4K(17:9) | 23.98p | 420/8bit Long GOP |
| 4K(16:9) | | |
| FHD(16:9) | | |

| D5d<br>VFR AVAILABILITY | D5e<br>HLG AVAILABILITY |
|---|---|
| ALL | ALL |
| AVAILABLE | AVAILABLE |
| UNAVAILABLE | UNAVAILABLE |

Fig. 11A
Fig. 11B
Fig. 11C
Video mode of refining result is 0 mode.

| CONDITION ITEM | CONDITION VALUE |
|---|---|
| FRAME RATE | 59.94p |
| NUMBER OF PIXELS | ALL |
| COMPRESSION METHOD | ALL |
| VFR AVAILABILITY | ALL |
| HLG AVAILABILITY | ALL |

| ID | GRAYOUT |
|---|---|
| 4 | YES |
| 5 | YES |
| 12 | YES |
| 13 | YES |
| 20 | NO |
| 21 | NO |
| 22 | NO |

*Fig. 15*

| FAVORITE TABLE | | D6 |
|---|---|---|
| ID | RECORDING FILE FORMAT | VIDEO SHOOTING AREA |
| 1 | MP4 | FULL SIZE AREA |
| 15 | MOV | S35 AREA |
| 30 | AVCHD | S35 AREA |
| | | |
| | | |

IMAGING APPARATUS

BACKGROUND

1. Technical Field

The present disclosure relates to an imaging apparatus having a plurality of video modes.

2. Related Art

JP 2001-346075 A discloses an image quality selecting method applied for a digital camera. This image quality selecting method displays selection candidates for number of imaging pixels and for an image compression rate in a two-dimensional arrangement on a setting screen for setting image quality of the digital camera, and presents combinations of the selectable number of pixels and the compression ratio to a user. This manner intends to provide a menu display method which is easy to visually understand without being confused when the user selects the image quality.

SUMMARY

A digital camera in recent years provides a plurality of video modes for a user to meet a wide variety of demands concerning image shooting, such as use for social networking service (SNS) and use for TV or movie production. A video mode is constituted by a combination of elements such as a number of pixels and a frame rate. While the number of the combination of these elements increases in accordance with an increase in the number of pixels and enhancement of performance, limitations are often imposed on the combination due to restrictions of hardware of a camera. Therefore, it gets difficult for users to see which video mode is equipped on a camera.

The present disclosure provides an imaging apparatus capable of facilitating a search for a video mode desired by a user.

An imaging apparatus of the present disclosure has a plurality of video modes for capturing videos with respective video quality, and includes a display, an operation receiver, and a controller. The display displays information indicating a plurality of video modes. The operation receiver receives a user operation for designating a video mode in the plurality of video modes based on the information displayed on the display. The controller sets the video mode designated via the operation receiver for the imaging apparatus. Each of the video modes has a plurality of elements corresponding to a plurality of items associated with the video quality. Combinations of the elements of different items are limited in the plurality of video modes. The controller receives, via the operation receiver, a user operation for setting a refining condition associated with at least one of the plurality of items, and refines, from the plurality of video modes, a video mode to be displayed on the display in accordance with the set refining condition.

An imaging apparatus according to the present disclosure is capable of refining a plurality of video modes to select a video mode to be displayed on a display, thereby facilitating a search for a video mode desired by a user.

BRIEF DESCRIPTION OF THE DRAWINGS

FIG. 3 is a diagram showing an example of a data structure of a video mode overall table of the digital camera;

FIG. 4 is a diagram showing an example of a data structure of a video shooting area check table;

FIGS. 5A and 5B are diagrams depicting data structures of a refining condition table and a video mode table, respectively;

FIG. 6 is a diagram showing an example of a data structure of a refining condition candidate table;

FIGS. 11A to 11C are diagrams each showing a display example of the refining process;

FIGS. 12A and 12B are diagrams showing data structures of a temporary refining condition table and a temporary video mode table, respectively;

FIG. 15 is a diagram showing an example of a data structure of a favorite table of the digital camera;

DETAILED DESCRIPTION

Embodiments will hereinafter be described in detail with reference to the drawings as appropriate. Note that excessively detailed descriptions may be omitted. For example, detailed descriptions of well-known matters and repeated explanation on substantially the same configuration may be omitted. These omissions are made to avoid unnecessary redundancy of the following description, and to help easy understanding by those skilled in the art. The inventor provides the accompanying drawings and the following description to help those skilled in the art sufficiently understand the present disclosure. The drawings and description are therefore not intended to limit the subject matters claimed in the appended claims.

First Embodiment

According to a first embodiment, a digital camera which has a plurality of operation modes each capable of at least capturing an image of an object to record video data will be described as an example of an imaging apparatus of the present disclosure.

1. Configuration

A configuration of the digital camera according to the first embodiment will be described with reference to FIG. 1.

Figure 1:
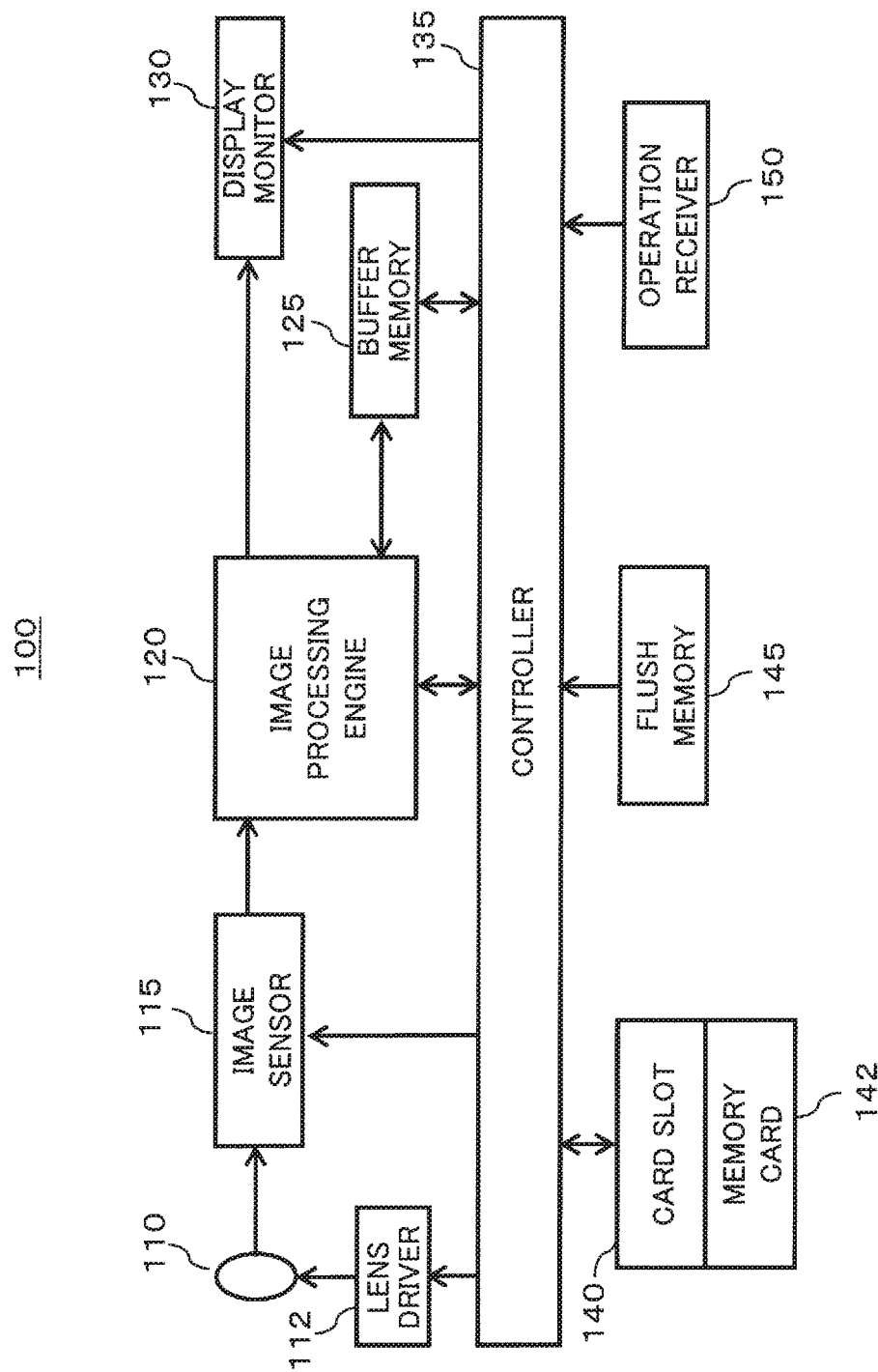
FIG. 1 is a diagram showing a configuration of a digital camera according to a first embodiment of the present disclosure.

FIG. 1 is a diagram showing a configuration of a digital camera 100 according to the present embodiment. The digital camera 100 of the present embodiment includes an image sensor 115, an image processing engine 120, a display monitor 130, and a controller 135. The digital camera 100 further includes a buffer memory 125, a card slot 140, a flash memory 145, and an operation receiver 150.

The digital camera 100 further includes an optical system 110 and a lens driver 112, for example. The optical system 110 and the lens driver 112 may constitute an interchangeable lens which is detachable from a body of the digital camera 100.

The optical system 110 includes a focus lens, a zoom lens, an optical image stabilization lens (OIS), an aperture, a shutter, and the like. The focus lens is a lens for changing a focus state of an object image formed on the image sensor 115. The zoom lens is a lens for changing a magnification of an object image formed by the optical system. Each of the focus lens and the like is constituted by one or more lenses.

The lens driver 112 drives the focus lens and the like of the optical system 110. The lens driver 112 includes a motor, and moves the focus lens along an optical axis of the optical system 110 under control by the controller 135. A configuration of the lens driver 112 for driving the focus lens may be implemented by a DC motor, a stepping motor, a servo motor, an ultrasonic motor, or the like.

The image sensor 115 captures an object image formed via the optical system 110, to generate imaging data. The imaging data constitutes image data indicating an image captured by the image sensor 115. The image sensor 115 generates image data indicating a new frame at a predetermined frame rate (for example, 30 frames/second). Generating timing of imaging data and an electronic shutter operation of the image sensor 115 are controlled by the controller 135. The image sensor 115 may be constituted by a CMOS image sensor, a CCD image sensor, an NMOS image sensor, or other various image sensors.

The image sensor 115 performs an imaging operation for capturing a still image, an imaging operation for capturing a through image, and the like. The through image is mainly constituted by a moving image, and is displayed on the display monitor 130 to allow a user to determine a composition for capturing a still image. Each of the through image and the still image is an example of a captured image according to the present embodiment. The image sensor 115 is an example of an imager according to the present embodiment.

The image processing engine 120 performs various processes on the imaging data output from the image sensor 115 to generate image data, and performs various processes on the image data to generate an image to be displayed on the display monitor 130. The various processes include, but are not limited to, white balance correction, gamma correction, YC conversion processing, electronic zoom processing, compression processing, decompression processing, and the like. The image processing engine 120 may be constituted by a hard-wired electronic circuit, or may be constituted by a microcomputer, a processor, or the like using a program.

The display monitor 130 is an example of a display which displays various information. For example, the display monitor 130 displays an image (through image) indicated by image data captured by the image sensor 115 and subjected to image processing by the image processing engine 120. The display monitor 130 further displays a menu screen or the like through which the user makes various settings for the digital camera 100. For example, the display monitor 130 may be constituted by a liquid crystal display device or an organic EL device.

The operation receiver 150 is a general term expressing a user interface which receives an operation (instruction) from the user. For example, the operation receiver 150 includes physical components such as a button, a lever, a dial, a touch panel, and a switch. The operation receiver 150 also includes virtual components such as a button and an icon displayed on the display monitor 130. A specific example of the operation receiver 150 will be described later.

The controller 135 integratedly controls an overall operation of the digital camera 100. The controller 135 includes a CPU and the like, and implements predetermined functions under a program (software) executed by the CPU. Instead of the CPU, the controller 135 may include a processor constituted by a dedicated electronic circuit designed to implement the predetermined functions. Accordingly, the controller 135 may be implemented by a CPU, an MPU, a GPU, a DSU, an FPGA, an ASIC, or other various processors. The controller 135 may be constituted by one or a plurality of processors. In addition, the controller 135 may be configured by one semiconductor chip together with the image processing engine 120 or the like.

The buffer memory 125 is a recording medium which functions as a work memory for the image processing engine 120 and the controller 135. The buffer memory 125 is implemented by a dynamic random access memory (DRAM) or the like. The flash memory 145 is a non-volatile recording medium. For example, the flash memory 145 stores various data structures (described below) for managing operation modes of the digital camera 100 according to the present embodiment. Each of the memories 145 and 125 is an example of a memory of the present embodiment.

The card slot 140 is a means into which a detachable memory card 142 is inserted. The card slot 140 is capable of electrically and mechanically connecting the memory card 142. The memory card 142 is an external memory inside of which a recording element such as a flash memory is equipped. The memory card 142 is capable of storing data such as image data generated by the image processing engine 120.

1-1. Operation Receiver

Figure 2:
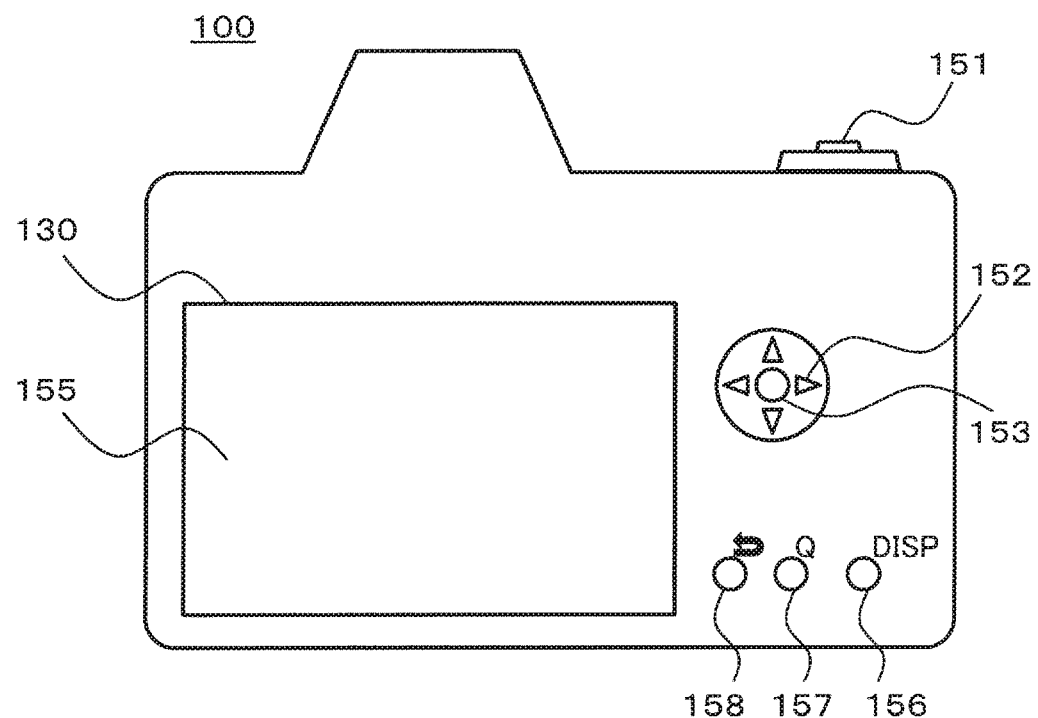
FIG. 2 is a diagram showing a rear of the digital camera.

A specific example of the operation receiver 150 will be described with reference to FIG. 2. FIG. 2 is a diagram showing a rear of the digital camera 100.

FIG. 2 shows an example of the operation receiver 150 which includes a release button 151, a selection button 152, a decision button 153, a touch panel 155, and a plurality of press buttons 156, 157, and 158. When receiving an operation from the user, the operation receiver 150 transmits various instruction signals to the controller 135.

The release button 151 is a two-stage press-type button. When the release button 151 is half-pressed by the user, the controller 135 executes auto focus control (AF control), auto exposure control (AE control), and the like. When the release button 151 is fully pressed by the user, the controller 135 records image data captured at the timing of the pressing operation as a recorded image in the memory card 142 or the like.

The selection button 152 is a press-type button provided in the up, down, left, and right directions. The user can select various condition items displayed on the display monitor 130 or move a cursor by pressing the selection button 152 in one of the up, down, left, and right directions.

The decision button 153 is a press-type button. When the user presses the decision button 153 in an imaging mode or a playback mode of the digital camera 1, the controller 135 displays a menu screen on the display monitor 130. The menu screen is a screen via which various conditions for imaging or playback are set. When the decision button 153 is pressed with a setting item of any one of the various conditions being selected, the controller 135 decides the setting of the selected item.

The touch panel 155 is superimposed on the display screen of the display monitor 130, and detects a touch operation on the display screen by a finger of the user. In this manner, the user is allowed to perform operations such as designation of a region of an image displayed on the display monitor 130, and various selections on the menu screen.

1-2. Data Structure

Described with reference to FIGS. 3 to 6 will be an example of a data structure for managing video modes of the digital camera 100 according to the present embodiment. Each of the video modes is an operation mode where the digital camera 100 captures and records a moving image as a video at respective video quality. It is assumed in the present embodiment that the digital camera 100 has a large number of video modes.

FIG. 3 shows an example of a data structure of a video mode overall table D1 of the digital camera 100. The video mode overall table D1 is a table for managing the video quality of each of the video modes allowed to be set for the digital camera 100.

For example, the video mode overall table D1 records an ID number, which identifies the video mode, and video quality information D1a in association with each other. Hereinafter, an example where there exist video modes whose ID numbers are "1" to "30" as shown in FIG. 3 will be used for illustration. The video quality information D1a is information associated with video quality of videos shot for each video mode. In the present example, the video quality information D1a includes a "number of pixels", a "frame rate", a "compression method", "availability of variable frame rate (VFR)", and "availability of "hybrid log gamma (HLG)".

In the present example, one item "number of pixels" of the video quality information D1a has six elements (or values) in total, i.e., "6K (3:2)", "5.4K (3:2)", "5.9K (16:9)", "C4K (17:9)", "4K (16:9)", and "FHD (16:9)" (see FIG. 6). The ratios in parentheses such as "(3:2)" indicate an aspect ratio. For the item "frame rate", four elements of "59.94p", "59.94i", "29.97p", and "23.98p" are provided. For the item "compression method", four elements of "422/10 bit ALL-Intra", "422/10 bit Long GOP", "420/10 bit Long GOP", and "420/8 bit Long GOP" are provided.

The elements in the respective items described above are examples of the constituent elements constituting video quality during recording of a video to be shot. Management of the constituent elements of the videos described above for each video mode allows the user to easily obtain videos having desired video quality.

For the item "VFR availability", two elements of "available" indicating that the VFR function is available, and "unavailable" indicating that the VFR function is unavailable are provided. Similarly, for the item "HLG availability", two elements of "available" and "unavailable" concerning the HLG function are provided. Such availability for each item is an example of a supplementary element indicating supplementary information associated with a moving image.

For example, the video mode with the ID number "1" has the number of pixels "6K (3:2)", the frame rate "23.98p", and the compression method "420/10 bit Long GOP". In this operation mode, the VFR function is unavailable, while the HLG function is available.

Concerning the foregoing video modes allowed to be set for the digital camera 100 in the present embodiment, it is assumed that combinations of elements corresponding to different items of the video quality information D1a are limited. For example, an operation mode having the pixel number of "6K (3:2)" and the frame rate of "59.94p" is not included in the video mode overall table D1 shown in FIG. 3, and therefore is an example not allowed to be set. In addition, the total number of the video modes is 30 which is smaller than the number of combinations the elements of the respective different items described above, and also smaller than the number of combinations of the constituent elements of the three items described above.

FIG. 4 shows an example of a data structure of a video shooting area check table D2. In the present embodiment, a case will be described where an item "video shooting area" is managed as an external item of the video modes, i.e. managed separately from the respective items of the video modes associated with video quality, by way of example. The "video shooting area" indicates an area used on an image plane of the image sensor 115 during video shooting, and may vary depending on the interchangeable lens to be used, for example.

The video shooting area check table D2 is a table for managing whether or not each of the video modes described above is available in accordance with the video shooting area set for the digital camera 100. In the present example, the "video shooting area" has three areas in total, i.e., "full size area", "S35 area", and "pixel by pixel area" in a descending order. In this case, "available/unavailable" of use of each video mode is recorded for each area in the video shooting area check table D2 in advance.

In the example of FIG. 4, the number of "unavailable" for each area is limited to 2 to 4 of 30 which is the total number of the ID numbers, and thus a majority of the items are "available". By managing these items as external items as in the video shooting area check table D2, management of the video modes can be simplified.

The foregoing limitations imposed on the video modes may arise from various specifications such as those for manufacture of the digital camera 100. The present embodiment provides a refining search function which facilitates a search for a desired video mode by the user under these limitations.

FIG. 5A shows an example of a data structure of a refining condition table D3. The refining condition table D3 is a table for setting refining conditions, which are conditions for narrowing down the video modes in the refining search function of the present embodiment. According to the present embodiment, the refining condition table D3 records condition items corresponding to respective items of the video quality information D1a, and condition values set for each of the condition items in association with each other.

FIG. 5A shows an example of the refining condition table D3 in an initial state at the time of manufacture and shipment of the digital camera 100, for example. The condition values of the respective condition items are set to "all". The condition value "all" is a condition value indicating that all elements of the corresponding condition item are included to be searched without particularly limiting elements.

FIG. 5B shows an example of a data structure of a video mode table D4. The video mode table D4 is generated based on the respective tables D1 to D3 described above to manage the video modes corresponding to the refining conditions, and is stored in the flash memory 145. According to the present embodiment, the video mode table D4 records ID information indicating the ID numbers of the video modes after refining, and grayout information in association with each other. The grayout information manages "yes/no" of grayout display (described below), i.e., whether or not grayout display is applied thereto.

The example in FIG. 5B shows a search result of the refining search function based on the refining condition table D3 in FIG. 5A. In this case, the ID information included in the video mode table D4 contains ID numbers of all 30 video modes. In addition, the present example is an example of the video mode table D4 when the video shooting area is set to a "full size".

In the grayout information, "yes" corresponds to "unavailable" in the video shooting area check table D2, and "no" corresponds to "available" in the video shooting area check table D2. In the example of FIG. 5B, grayout display is applied to a limited number of four video modes. Predetermined information may be in advance associated with each piece of data indicating grayout information "yes" and stored in the flash memory 145.

FIG. 6 shows a data structure of a refining condition candidate table D5. The refining condition candidate table D5 includes candidate value tables D5a to D5e for the respective condition items described above to manage candidates for candidate values, which are the condition values of the respective condition items of the refining search function.

For example, the candidate value table D5a indicating the condition item of the "number of pixels" includes "all" and values indicating each of the foregoing six elements as candidate values. The other candidate value tables D5b to D5e also include the candidate value "all". Each of the candidate value tables D5b and D5c associated with the frame rate and the compression method includes values of the four elements respectively as described above. Similarly, each of the candidate value tables D5d and D5e associated with VFR availability and HLG availability includes values of the two elements described above.

The refining condition table D3 is set in accordance with selection of the refining conditions at the time of execution of the refining search function using the refining condition candidate table D5 described above.

2. Operation

Hereinafter, the operation of the digital camera 100 configured as described above will be described.

The digital camera 100 according to the present embodiment performs an operation enabling the user to set a desired video mode via a setting menu or the like prior to an imaging operation for capturing a moving image as video shooting. The refining search function is provided to facilitate a search for a video mode in the video mode setting operation described above. An outline of the refining search function of the digital camera 100 will be described with reference to FIG. 7.

Figure 7A:
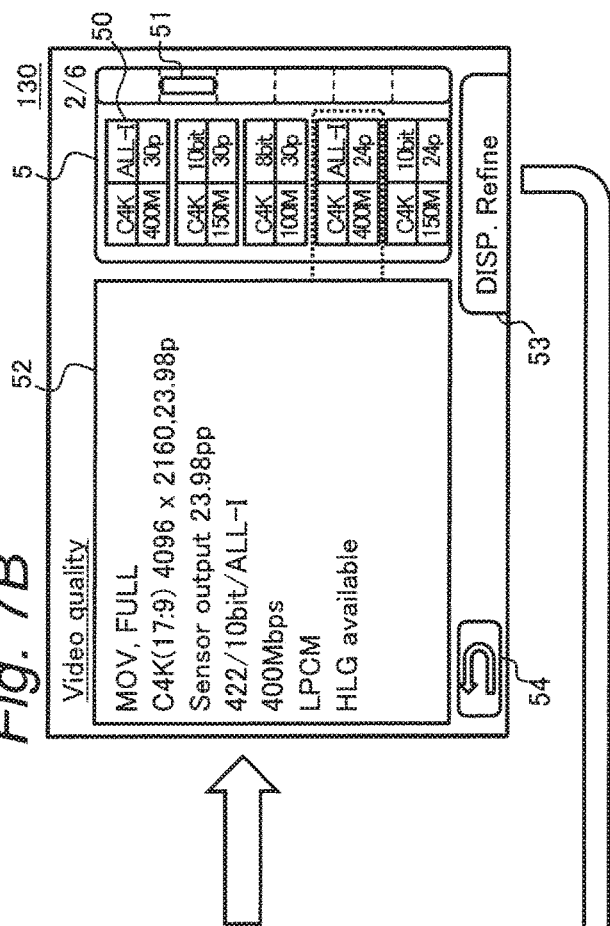
FIG. 7A to 7D are diagrams for explaining an outline of a refining search function of the digital camera.

FIG. 7A shows a display example of a setting menu screen of the digital camera 100. The present display example shows a state achieved by selecting a video tab 40 used for setting respective information associated with videos, and selecting a recording icon 41 associated with a video recording method. The display monitor 130 displays, as menu items at this time, "recording file format", "video shooting area", "video quality", "variable frame rate", and others.

The menu item "recording file format" is set to MOV in the present example. Other types of file format such as MP4 or AVCHD can also be set. The video shooting area "FULL" refers to the full size area described above. In addition, "variable frame rate" sets availability or unavailability of the VFR function as settings of on or off.

According to the present embodiment, the menu item "video quality" is provided to allow the user to set a video mode having desired video quality. FIG. 7B shows an example of a video quality setting screen to which the screen transitions when the menu item "video quality" is selected in FIG. 7A.

The display monitor 130 displays, on the video quality setting screen, a video mode selection list 5 where a plurality of video mode icons 50 are arranged, an explanatory text field 52 corresponding to a selection result selected from the list 5, a refining button 53, a return button 54, and the like.

The video mode selection list 5 is provided with a scroll bar 51 for enabling the video mode icons 50 outside one screen of the display monitor 130 to be displayed sequentially in accordance with an operation by the user. The video mode icons 50 indicate video modes having respective levels of video quality. The explanatory text field 52 displays text information explaining details of the image quality or the like of the video mode corresponding to the video mode icon 50 selected in accordance with the operation by the user.

According to the display of the video mode selection list 5 in the manner described above, the user can search for a desired video mode by selecting the video mode icon 50 of interest from the plurality of video mode icons 50 and checking details in the explanatory text field 52, for example.

FIG. 7B herein shows the display example prior to the use of the refining search function. According to the present example, the total number of the video modes is 30 (see FIG. 3), and the video mode selection list 5 has a considerable length which covers six screens of the display monitor 130. Therefore, it is considered that the way the user searches a desired video mode as described above would be considerably complicated.

Meanwhile, it is also considered to adopt a method different from the display method of the video mode selection list 5 shown in FIG. 7B. More specifically, also considered is a sequential selection method in which menu items for selecting elements constituting a video one by one is provided, and the user operates the respective menu items one by one to set a video mode.

However, settable video modes of a digital camera do not cover all combinations of constituent elements of different items, and thus limitations are imposed on these combinations in some situations. If the sequential selection method described above is used in these situations, this method would often cause an event where a constituent element which the user desires to be set for a menu item cannot be selected, depending on a constituent element selected by the user for another menu item. As such dependency is difficult for the user to grasp, it would be hard for the user to reach a desired video mode in some cases.

To solve this, the digital camera 100 of the present embodiment provides the refining search function that is a function of refining video modes to be displayed as selection candidates upon displaying information on the plurality of video modes such as the video mode icons 50 of the video mode selection list 5.

Figure 7C:
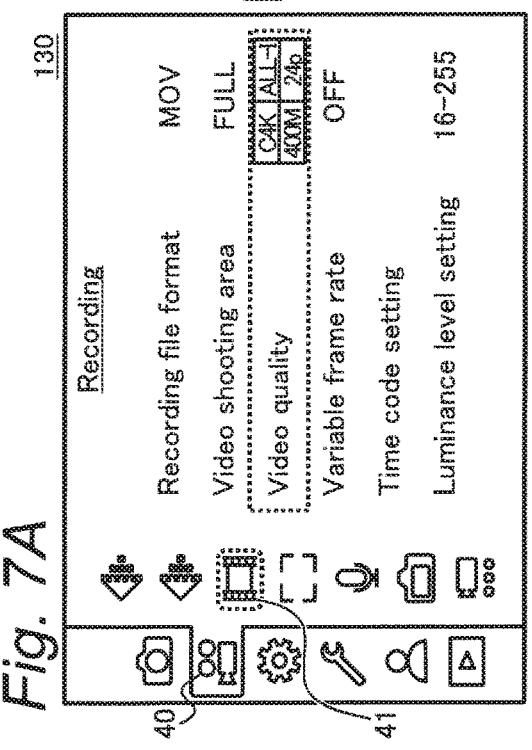
Figure 7B:
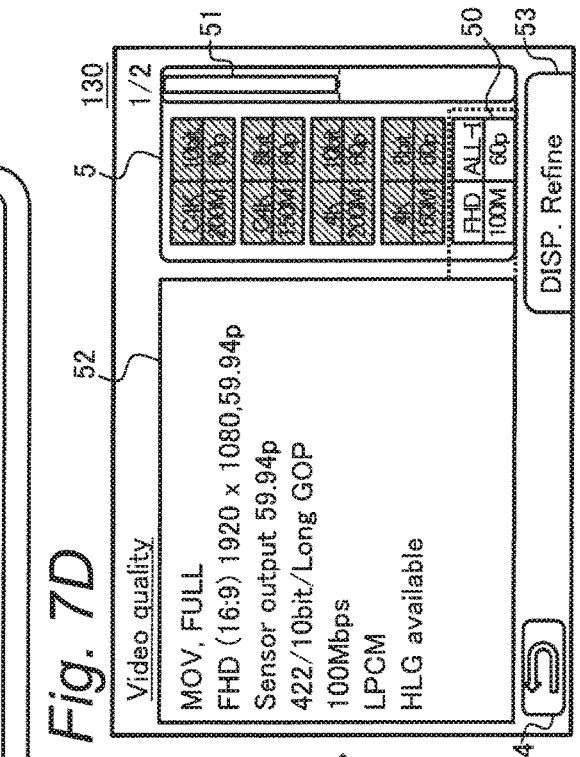

FIG. 7C shows an example of a refining condition setting screen for using the refining search function according to the present embodiment. The display monitor 130 displays the refining conditions, and the number of video modes as a refining result under the refining conditions. The refining conditions are set in accordance with designation of condition values desired by the user as values of condition items such as the "frame rate" (see FIGS. 5 and 6). The condition items may include an item defining a constituent element of a video, and an item associated with supplementary information.

The user can selectively designate a condition item of his or her interest on the refining condition setting screen. In the example in FIG. 7C, the "frame rate" is designated as "59.94p". On the other hand, the other condition items are set to "all", and no specific value is designated. According to the present example, the number of the video modes is reduced from the number in the state of FIG. 7B to seven under the refining conditions designated by the user as described above.

Figure 7D:
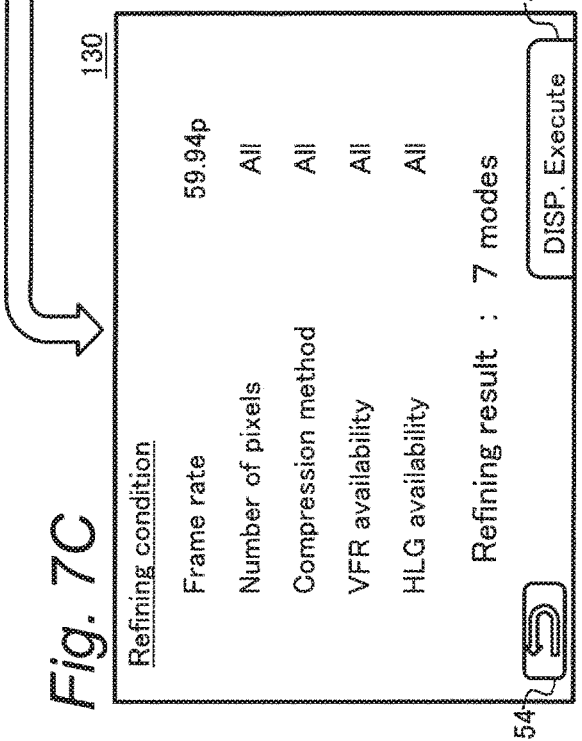

FIG. 7D shows an example of a video quality setting screen after refining in FIG. 7C. In this case, the number of the video mode icons 50 included in the video mode selection list 5 is reduced from 30 in FIG. 7B to seven. The user can search a desired video mode while checking details of the video mode icons 50 of the number obtained as a result of refining the desired video mode icons 50. As described above, the refining search function facilitates a search for a video mode by the user. Hereinafter, the operation of the digital camera 100 as described above will be described in detail.

2-1. Video Mode Setting Operation

The video mode setting operation performed by the digital camera 100 will be described with reference to FIGS. 8 and 9.

Figure 8:
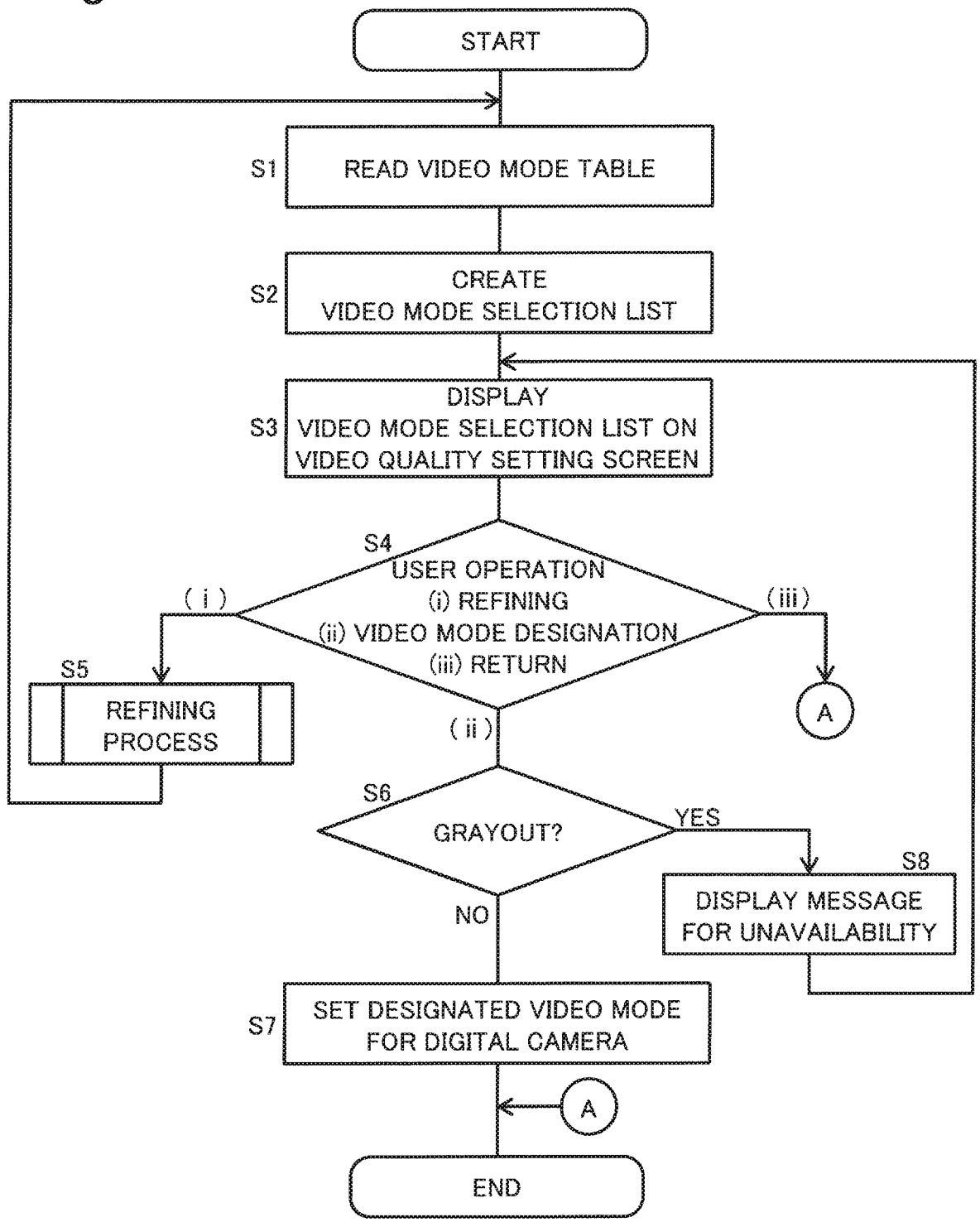
FIG. 8 is a flowchart showing an example of a video mode setting operation of the digital camera according to the first embodiment.

FIG. 8 is a flowchart showing an example of a video mode setting operation performed by the digital camera 100 according to the first embodiment. A process shown in this flowchart starts when an operation for selecting the menu item "video quality" is input from the user via the setting menu screen in FIG. 7A, and is executed by the controller 135 of the digital camera 100.

At first, the controller 135 reads ID information and grayout information from the video mode table D4 stored in the flash memory 145 in advance (S1). In the example of FIG. 5B, the ID numbers and the like corresponding to all of the 30 video modes are read, for example.

Subsequently, referring to the video quality information D1a associated with the ID number which matches the read ID information in the video mode overall table D1, the controller 135 creates the video mode selection list 5 (S2). The video mode selection list 5 is, as information to be displayed on the display monitor 130, configured to include the video mode icons 50 each corresponding to the read ID information and data indicating the corresponding explanatory text field 52 in association with each other.

Thereafter, the controller 135 controls the display monitor 130 to display the created video mode selection list 5 on the video quality setting screen (S3). For example, based on the video mode table D4 as in FIG. 5B (S1), the display monitor 130 displays the setting screen as in FIG. 7B (S3). At this time, the controller 135 makes grayed out display for the video mode icon 50 corresponding to the ID number with grayout information "yes".

In a state where the video quality setting screen such as the screen shown in FIG. 7B is displayed, the controller 135 operates to be able to receive various operations from the user via the operation receiver 150 (S4). The user operations to be received in step S4 include (i) refining operation, (ii) video mode designation operation, and (iii) return operation.

The refining operation ((i) in S4) is a user operation for instructing execution of the refining search function. For example, the refining operation is implemented as a touch operation performed by the user for touching the refining button 53, which is displayed on the display monitor 130, on the touch panel 155. In addition to or instead of such a touch operation, the refining operation may be implemented as a pressing operation for pressing the press button 156, for example.

The video mode designation operation ((ii) in S4) is a user operation for designating the video mode to be set to the digital camera 100. For example, the user can input the video mode designation operation by selecting the video mode icon 50 by the touch operation or the like as well as using the scroll bar 51 in the video mode selection list 5 appropriately, and pressing the decision button 153 with the video mode icon 50 being selected.

The return operation ((iii) in S4) is a user operation for returning to the setting menu screen without executing designation of the video mode, for example. The return operation is implemented as a touch operation for touching the return button 54 displayed on the display monitor 130, a pressing operation for pressing the press button 158, or the like.

When the user inputs the refining operation ((i) in S4), the controller 135 executes a refining process, which is a process for executing the refining search function while displaying the refining condition setting screen (see FIG. 7C) or the like (S5). Details of the refining process (S5) will be described later. After the refining process (S5), the controller 135 performs the processes of step S1 and subsequent steps again. As a result, the video mode selection list 5 as the refined result is obtained as shown in FIG. 7D, for example (S2, S3).

When the user inputs the video mode designation operation ((ii) in S4), the controller 135 determines whether or not the grayout information associated with the ID number of the video mode selected by this designation operation is "yes" (S6). For example, when the user presses the decision button 153 in a state where the video mode icon 50 with grayed out display is selected ((ii) in S4), the controller 135 proceeds to YES in step S6.

When the controller 135 determines that the grayout information associated with the designated video mode is "yes" (YES in S6), the controller 135 displays a message for unavailability on the display monitor 130 for a predetermined period, for example (S8). The message for unavailability is an example of information indicating that the designated video mode is unavailable due to a state in advance set separately for the digital camera 100. FIG. 9 shows a display example of step S8.

Figure 9:
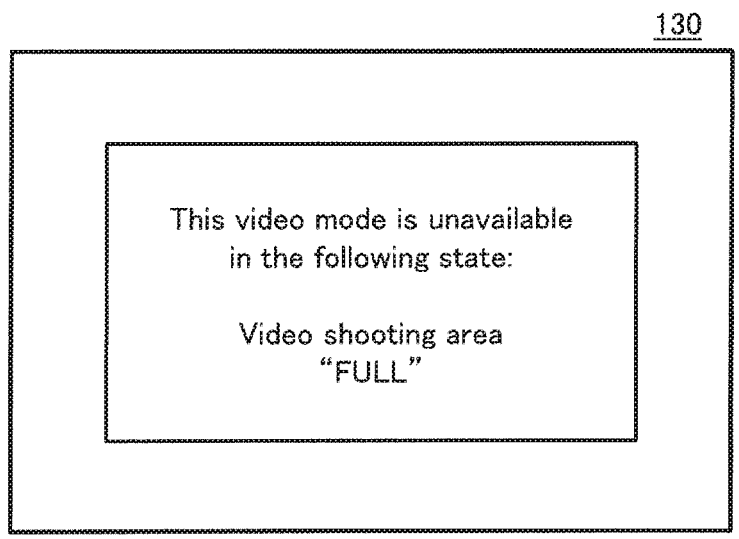
FIG. 9 is a diagram showing a display example of the video mode setting operation.

FIG. 9 shows an example which designates a video mode to which an ID number of 4 is given in a state where the video shooting area is set to "full size". For example, information indicating respective messages for unavailability is beforehand stored in the flash memory 145 in association with ID numbers indicating grayout information "yes". In step S8, the controller 135 controls the display monitor 130 with reference to this information stored in the flash memory 145. The controller 135 performs again the processes of step S3 and subsequent steps after the display of step S8.

On the other hand, when determining that the grayout information associated with the video mode designated in (ii) in step S4 is "no" (NO in S6), the controller 135 updates various setting information indicating the current video quality and the like to set the designated video mode for the digital camera 100 (S7).

Thereafter, the controller 135 controls the display monitor 130 to close the video mode setting menu, and ends the process shown in this flowchart. As a result, the display monitor 130 transitions to a setting menu screen similar to the screen of FIG. 7A. At this time, the video mode icon 50 indicating the set video mode is displayed for the menu item "video quality".

When the user inputs the return operation ((iii) in S4), the controller 135 ends the process of this flowchart without particularly changing the setting of the video mode.

According to the process described above, the video mode setting operation is performed using the video mode selection list 5 on the video quality setting screen. At this time, the number of the video modes to be displayed in the selection list 5 is reduced (S5) in accordance with the refining operation by the user ((i) in S4). In this manner, the refining search function can be implemented to assist a video mode search performed by the user.

When an unavailable video mode is present in the current state of the digital camera 100 set separately from the video quality, the corresponding video mode icon 50 is displayed in grayout based on the grayout information included in the video mode table D4 (S1 to S3). When the grayout-displayed video mode icon 50 is designated by the user ((ii) in S4), the message for unavailability is further displayed as shown in FIG. 9, for example (S8).

The message for unavailability exemplified in FIG. 9 indicates that "the designated video mode cannot be set in the video shooting area 'FULL'". Based on this indication, the user can understand that the designated video mode will be available by changing the setting of the menu item "video shooting area" from the "full size area". In this manner, the user can easily reach the desired setting based on the message display in step S8.

2-2. Refining Process

Figure 10:
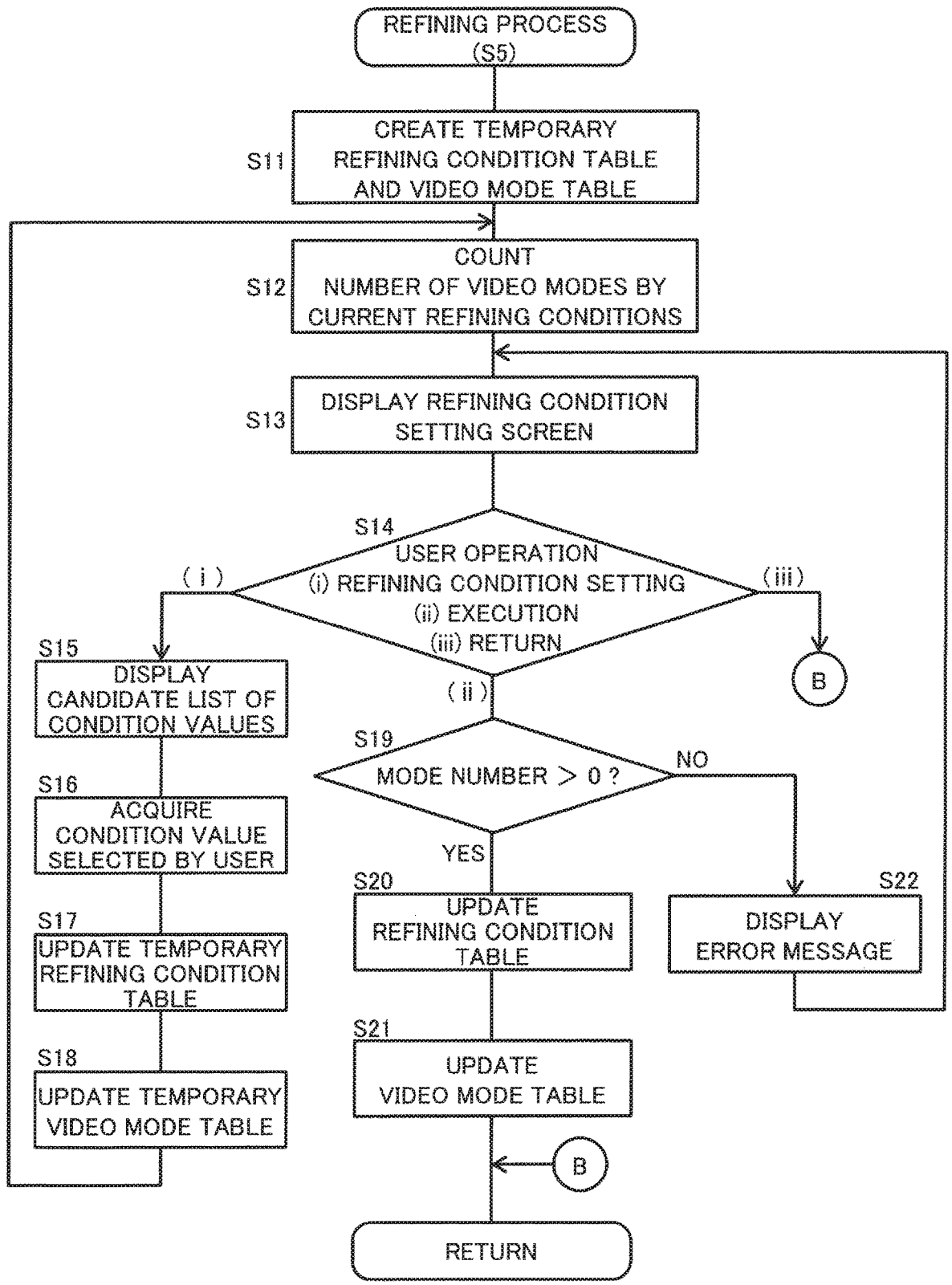
FIG. 10 is a flowchart showing an example of a refining process of the digital camera.

Details of the refining process in step S5 in FIG. 8 will be described with reference to FIGS. 10 to 12. FIG. 10 is a flowchart showing an example of the refining process performed by the digital camera 100.

At first, the controller 135 creates a temporary refining condition table and a temporary video mode table (S11). For example, the controller 135 reads the video mode table D4 and the refining condition table D3, which are in advance stored in the flash memory 145, into the buffer memory 125 as temporary tables.

Subsequently, the controller 135 counts the number of video modes included in the temporary video mode table (S12). The number counted in step S12 represents a refining result obtained under the current refining condition indicated by the temporary refining condition table.

Thereafter, the controller 135 controls the display monitor 130 to display a refining condition setting screen in accordance with the current refining condition and the number of counts (S13). FIG. 11A shows a display example of step S13. The present display example shows a refining condition setting screen when the respective tables D3 and D4 exemplified in FIGS. 5A and 5B are used (S11 and S12).

With the setting screen such as in FIG. 11A displayed, the controller 135 operates to be able to receive various user operations via the operation receiver 150 (S14). The user operations to be received in step S14 include (i) a refining condition setting operation, (ii) an execution operation, and (iii) a return operation.

The refining condition setting operation ((i) in S14) is a user operation for setting a desired refining condition. For example, the user can input the setting operation by selecting any one of the condition items displayed on the setting screen described above to designate a condition value by a touch operation, an operation using the selection button 152, or the like.

The execution operation ((ii) in S14) is a user operation for instructing execution of refining of the video mode to be displayed on the video quality setting screen in accordance with the set refining condition. For example, the execution operation is implemented as a touch operation for touching the execution button 55 displayed on the refining condition setting screen, a pressing operation for pressing the press button 156, or the like.

The return operation ((iii) in S14) is performed in a manner similar to that of (iii) in step S4 in FIG. 8 as a user operation for returning to the video quality setting screen without executing refining of the video mode.

When the user inputs the refining condition setting operation ((i) in S14), the controller 135 reads the candidate value table D5*b* corresponding to the condition item selected by this setting operation from the refining condition candidate table D5, and displays a candidate list 56 of condition values on the screen (S15). FIG. 11B shows a display example of step S15.

In the state shown in FIG. 11B, the user can select a desired condition value from the candidate list 56 by a touch operation, an operation using the selection button 152, or other operations, for example. The controller 135 acquires the condition value selected in accordance with the operation performed by the user via the operation receiver 150 (S16).

The controller 135 updates the temporary refining condition table in accordance with the acquired condition value (S17). FIG. 12A shows an example of a temporary refining condition table D30 after the update.

Furthermore, the controller 135 updates the temporary video mode table based on the updated temporary refining condition table D30 (S18). FIG. 12B illustrates an example of a temporary video mode table D40 after the update.

In step S18, the controller 135 initially searches for ID numbers corresponding to the refining condition indicated in the updated temporary refining condition table D30 from the video mode overall table D1 to acquire ID information in the temporary video mode table D40 after the update. Further, the controller 135 searches the video shooting area check table D2 based on the same ID information, and sets grayout information associated with the respective ID numbers in the temporary video mode table D40 in accordance with the search result.

Thereafter, the controller 135 executes again the processes of step S12 and the subsequent steps based on the updated temporary refining condition table D30 and the temporary video mode table D40. As a result, the number of the video modes corresponding to the refining conditions indicated by the updated temporary refining condition table D30 is counted (S12), and the number indicating the refining result is displayed (S13). The display example in FIG. 7C corresponds to the update results in FIGS. 12A and 12B. In the present display example, the user can check that the number of the video modes is smaller than in the case of FIG. 11A.

When the user inputs the execution operation ((ii) in S14), the controller 135 determines whether or not the number counted as the result of refining of the video modes exceeds 0 (i.e., one or more) (S19).

When the number of the refining results is 0 (NO in S19), the controller 135 controls the display monitor 130 to display an error message (S22). FIG. 11C shows a display example of step S22. For example, the controller 135 displays an error message shown in FIG. 11C for a predetermined period, then returns to the display of step S13, and operates again to be able to receive a user operation (S14).

On the other hand, when the number of the refining results is one or more (YES in S19), the controller 135 updates the refining condition table D3 stored in the flash memory 145 by overwriting with the temporary refining condition table D30 (S20). Further, the controller 135 updates the video mode table D4 by overwriting with information included in the temporary video mode table D40 (S21).

After updating the respective tables D3 and D4 (S20, S21), the controller 135 ends the refining process (S5 in FIG. 8), and performs the processes of step S1 and the subsequent steps again. When the screen returns to the video quality setting screen in this case, the video mode icon 50 after refining of the video mode selection list 5 is displayed (see FIG. 7D).

When the user inputs the return operation ((iii) in S14), the controller 135 ends the process of step S5 in FIG. 8 without particularly updating the tables D3 and D4 stored in the flash memory 145. At this time, the temporary tables D30 and D40 may be deleted, or may be updated based on the information included in the tables D3 and D4 stored in the flash memory 145.

According to the refining process described above, a video mode corresponding to a demand of the user is automatically searched (S17, S18) to implement the refining search function when the refining condition setting operation performed by the user is received (S14 to S16).

In the refining process described above, the number of the video modes meeting the current refining condition is displayed during setting of the refining condition prior to execution of refining (S12, S13). In this manner, the user can adjust setting of the refining condition while checking the number of the video mode icons 50 displayed in accordance with execution of refining. Therefore, it can facilitate to easily search the video mode.

In step S12, the number of the video modes is counted regardless of "yes/no" of grayout information, for example. The user can see the reason why the video mode displayed in grayout is currently unavailable based on the message for unavailability shown in FIG. 9 or the like. Step S12 is not limited to the above process. For example, the controller 135 may separately count the number of grayout information "yes" and the number of grayout information "no", or may count only the grayout information "no".

The refining condition table D3 and the video mode table D4 indicating a refining result are updated at the time of execution of the refining (S20, S21), and are saved in the flash memory 145 even after the moving mode setting operation, for example. In this manner, the video mode selection list 5 indicating a previous refining result is displayed when the user enters the video quality setting screen in the setting menu again. Accordingly, the user can easily search a video mode of interest.

3. Summary

As described above, the digital camera 100 according to the present embodiment is an example of an imaging apparatus having a plurality of video modes for capturing videos with respective video quality. The digital camera 100 includes the display monitor 130 which is an example of the display, the operation receiver 150, and the controller 135. The display monitor 130 displays information indicating the plurality of video modes described above, such as the video mode icons 50. The operation receiver 150 receives a user operation for designating a video mode in the plurality of video modes based on the information displayed on the display monitor 130 ((ii) in S4). The controller 135 sets the video mode designated via the operation receiver 150 for the imaging apparatus (S7). Each of the video modes has a plurality of elements corresponding to a plurality of items associated with video quality. Combinations of the elements of the different items in the plurality of video modes are limited (see FIGS. 3 to 5B). The controller 135 receives, via the operation receiver 150, a user operation for setting a refining condition associated with at least one of the plurality of items ((i) in S4), and refines, from the plurality of video modes, a video mode to be displayed on the display monitor 130 in accordance with the set refining condition (S5).

According to the digital camera 100 described above, a number of video modes allowed to be set for the imaging apparatus are narrowed to select the video mode to be displayed on the display monitor 130 even when combinations of elements of different items are limited. Accordingly, the user can easily search a desired video mode.

According to the present embodiment, the refining condition specifies an element of at least one of a plurality of items (see FIGS. 11A to 11C and FIGS. 12A and 12B). The controller 135 refines the video mode to be displayed on the display monitor 130 into the video mode having the specified element in accordance with the refining condition (S5). In this manner, the user can instruct refining of the video mode by setting an element of an item of interest selected from a plurality of items in the video mode. Accordingly, the user can easily search for a desired video mode.

According to the present embodiment, the controller 135 causes the display monitor 130 to display the number of video modes meeting the refining condition in the plurality of video modes in accordance with the setting of the refining condition via the operation receiver 150 (S12, S13). The user can recognize an outline of execution under the current refining condition based on the display of the number after refining, and therefore can easily search for a video mode.

According to the present embodiment, when the video mode designated via the operation receiver 150 is unavailable in a state preset for the digital camera 100, the controller 135 causes the display monitor 130 to display information indicating that the designated video mode is unavailable in the preset state. (FIG. 9). In this manner, the user is urged to change the foregoing setting, and therefore can easily reach a desired video mode.

According to the present embodiment, the digital camera 100 further includes the flash memory 145 as an example of the memory. The flash memory 145 stores the video mode overall table D1 as an example of information for managing a plurality of video modes within a range where combinations of elements of different items are limited. Video modes allowed to be set for the digital camera 100 are managed based on this information. Accordingly, the user can easily set a desired video mode.

According to the present embodiment, the plurality of items associated with video quality include at least one of a frame rate, a number of pixels, a compression method, availability of a VFR function, and availability of an HLG function of a moving image. The VFR function and the HLG function are examples of additional functions associated with a video. The user can easily search for a video mode having desired image quality by setting the refining conditions of these items.

Second Embodiment

In the first embodiment, the video mode refining search function of the digital camera 100 has been described. In a second embodiment, a favorite registration function, which allows the user to register and call a desired video mode, will be described.

Hereinafter, the digital camera 100 according to the present embodiment will be described while omitting description of configurations and operations similar to those of the digital camera 100 according to the first embodiment.

1. Outline

FIG. 13 is a diagram for explaining an outline of a favorite registration function of the digital camera 100 according to the present embodiment.

Figure 13B:
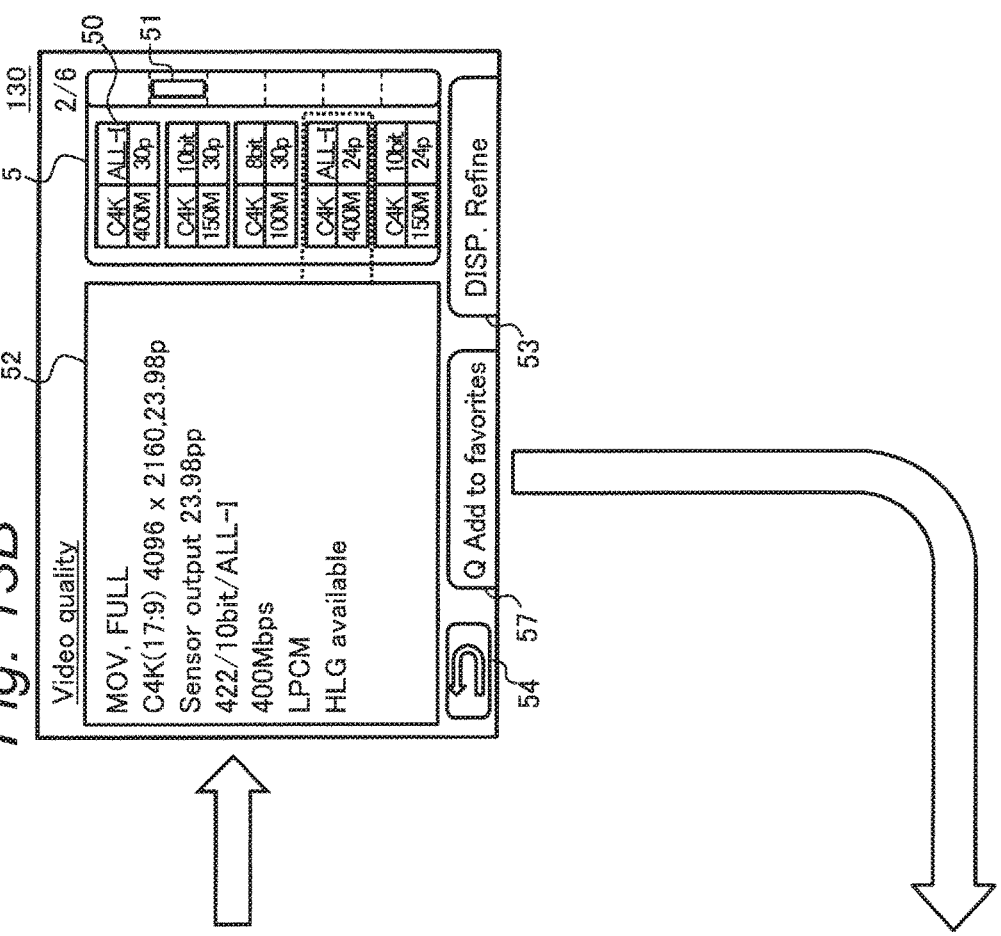
FIGS. 13A to 13C are diagrams for explaining an outline of a favorite registration function of a digital camera according to a second embodiment.
Figure 13A:
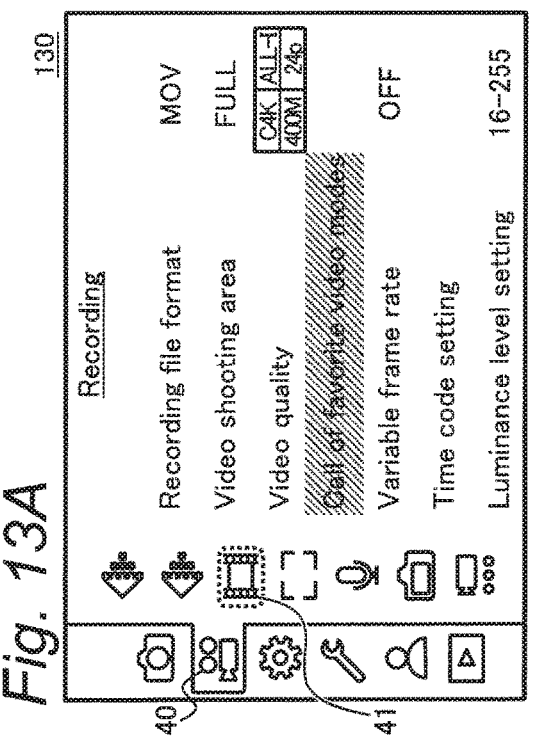

FIG. 13A shows an example of a setting menu screen prior to favorite registration in the present embodiment. According to the present embodiment, a new menu item "call of favorite video mode" is provided in addition to menu items similar to those of the first embodiment (FIG. 7A). In the state of FIG. 13A, the new menu item described above is displayed in grayout so that it is invalidated.

FIG. 13B shows an example of a video quality setting screen according to the present embodiment. According to the example of FIG. 13B, a favorite registration button 57 is further displayed on a setting screen similar to the setting screen in FIG. 13D. In the video mode setting operation according to the present embodiment, the controller 135 further operates to be able to receive a favorite registration operation in addition to (i) to (iii) in step S4 in processes similar to those in FIG. 8, for example.

The favorite registration operation is a user operation to register a desired video mode as a favorite video mode. For example, the favorite registration operation is implemented as a touch operation for touching the favorite registration button 57 with a desired video mode being selected from the video mode selection list 5. In addition to or instead of such a touch operation, the favorite registration operation may be implemented as an operation for pressing the press button 157, for example. The foregoing favorite registering process executed in accordance with the user operation to register the favorite video mode will be described later.

Figure 13C:
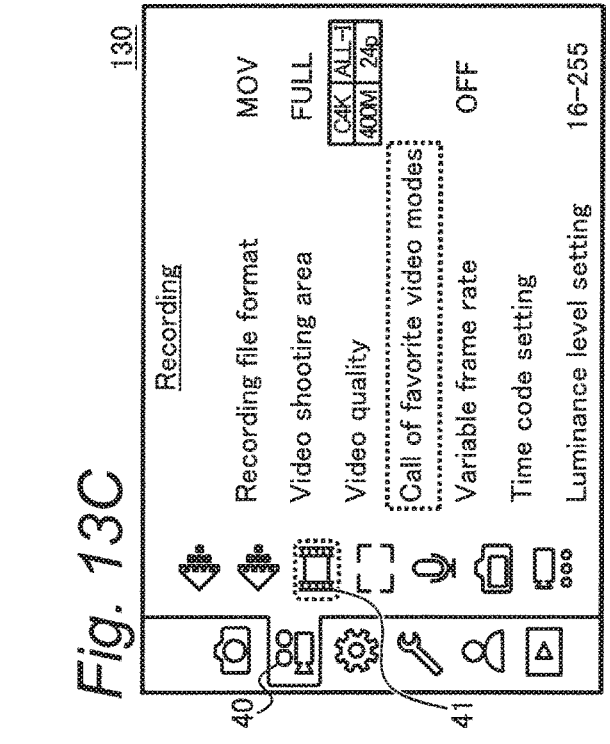

FIG. 13C shows a setting menu screen after favorite registration. When at least one favorite video mode is registered, the menu item "call favorite movie mode" is validated. In response to a user operation to enter this menu item, a favorite video mode registered previously is called, and allowed to be set for the digital camera 100. The favorite calling process for achieving this function will be described later.

According to the favorite registration function as described above, the user can easily set a desired video mode by registering a frequently used video mode as a favorite video mode, for example.

2-1. Favorite Registering Process

The favorite registering process according to the present embodiment will be described with reference to FIGS. 14 to 16.

Figure 14:
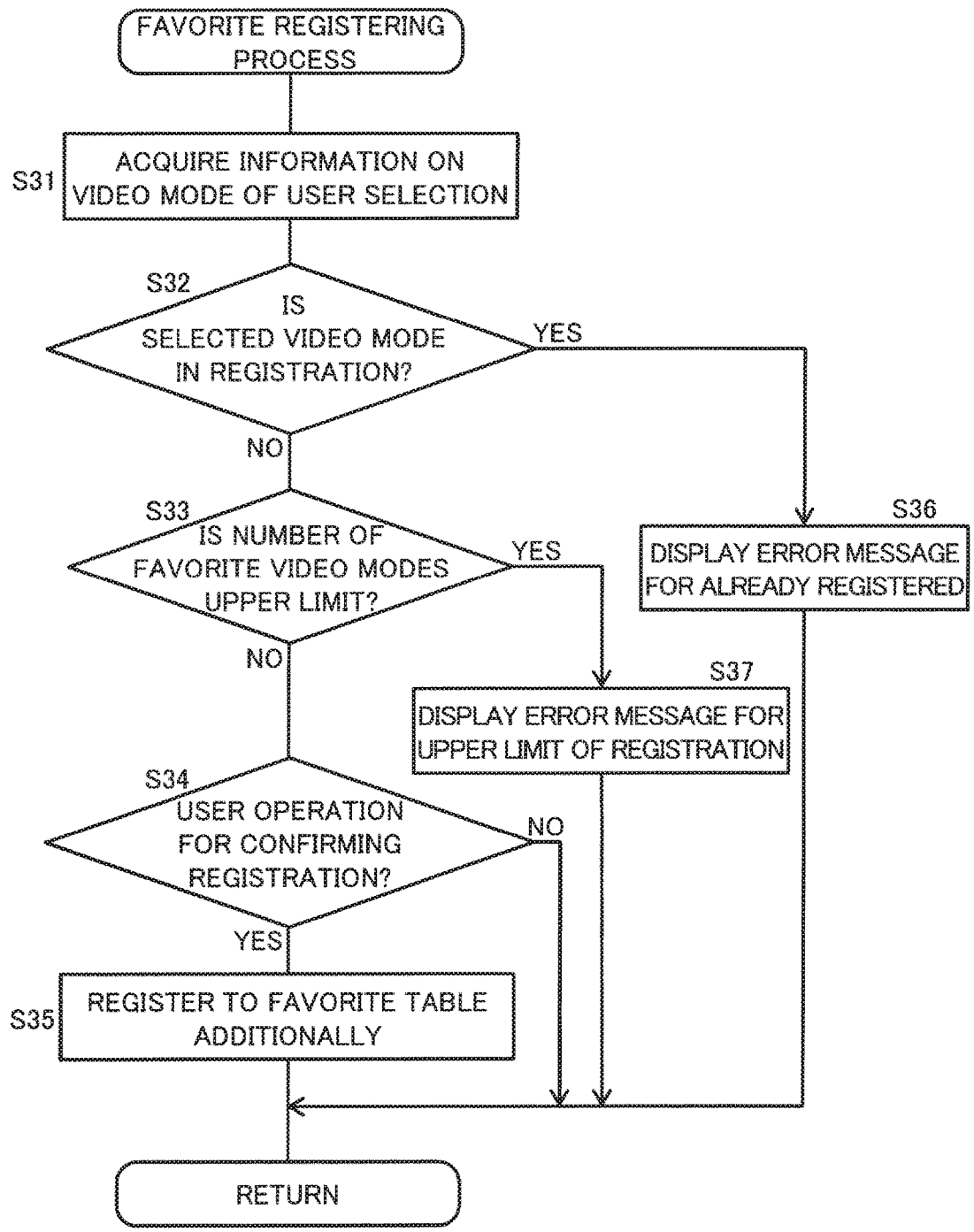
FIG. 14 is a flowchart showing an example a favorite registering process of the digital camera.

FIG. 14 is a flowchart showing an example of the favorite registering process. The process shown in this flowchart starts in response to input of a favorite registration operation selecting the video mode icon 50 without grayed out display, and is executed by the controller 135.

FIG. 15 is a diagram showing a data structure of a favorite table D6 of the digital camera 100. The favorite table D6 is a table for managing a video mode registered as a favorite video mode. According to the present embodiment, the favorite table D6 is stored in the flash memory 145 in advance, for example.

In the flow of FIG. 14, the controller 135 initially reads an ID number of a video mode selected by the favorite registration operation from the video mode table D4 (S31). The controller 135 determines whether or not the same ID number as the read ID number is included in the favorite table D6 stored beforehand (S32).

When the ID number of the selected video mode is not included in the favorite table D6 (NO in S32), for example, the controller 135 determines whether or not the number of the registered favorite video modes reaches a predetermined upper limit (S33). The upper limit is set beforehand as the number of modes allowed to be registered in the favorite table D6, for example. FIG. 15 shows an example in which the upper limit is set to five.

Figure 16A:
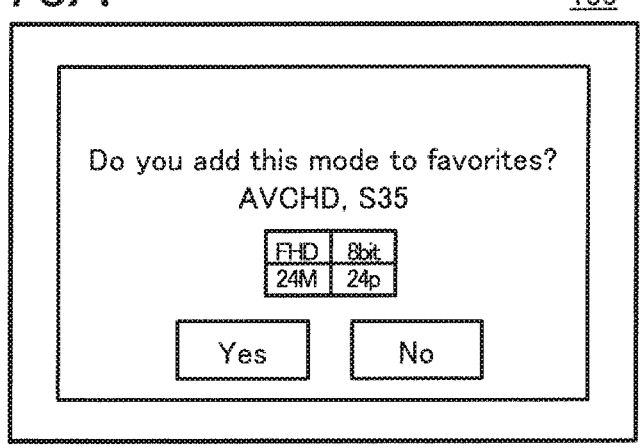
FIGS. 16A to 16C are diagrams each showing a display example of the favorite registering process.

When the number of the video modes registered in the favorite table D6 does not reach the upper limit (NO in S33), for example, the controller 135 causes the display monitor 130 to display a message for confirming registration, and receives an user operation for determining whether to execute registration (S34). FIG. 16A shows a display example of step S34. In the present display example, an operation for selecting "Yes" or "No" can be input from the user.

When "Yes" is selected in accordance with the user operation (YES in S34), the controller 135 registers the selected video mode in the favorite table D6 (S35). According to the example of FIG. 15, for example, the controller 135 additionally records the ID number of the selected video mode, the current setting value of the "recording file format", and the current setting value of the "video shooting area" in association with each other in the favorite table D6. According to the present embodiment, these setting values are recorded in the favorite table D6 to use the setting values at the time of calling and setting the favorite video mode.

After updating the favorite table D6 (S35), the controller 135 ends the favorite registering process. Thereafter, the controller 135 causes the display monitor 130 to display a video quality setting screen such as the screen shown in FIG. 13B, for example, and performs again a process similar to the process of step S4 in FIG. 8.

On the other hand, when "Yes" is selected in accordance with a user operation (NO in S34), the controller 135 ends the process of this flowchart without particularly updating the favorite table D6, and returns to step S4.

Figure 16B:
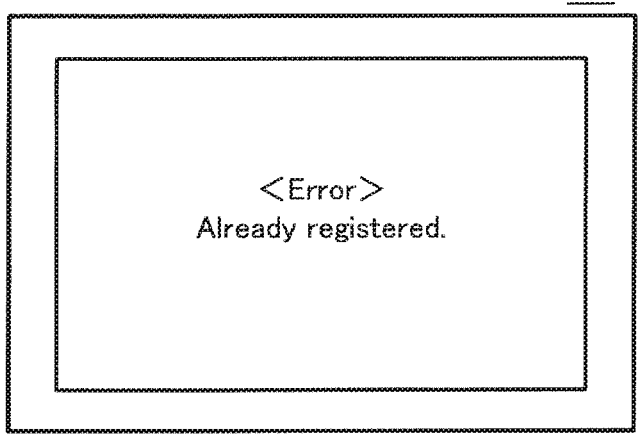

When the ID number of the video mode selected by the favorite registration operation is already included in the favorite table D6 (YES in S32), the controller 135 causes the display monitor 130 to display an error message indicating already registered (S36) as shown in FIG. 16B, for example.

Figure 16C:
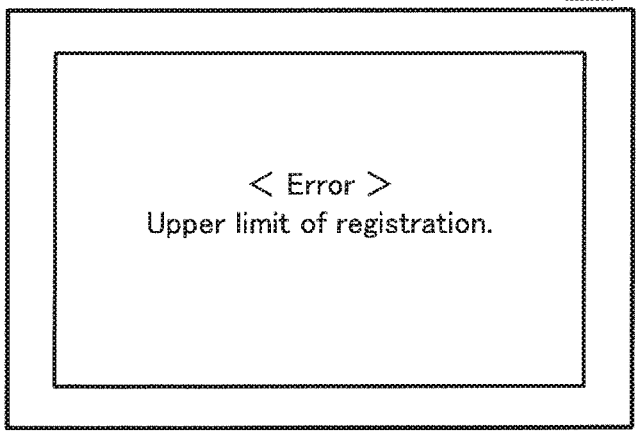

When the number of the video mode registered in the favorite table D6 reaches the upper limit (YES in S33), the controller 135 causes the monitor 130 to display an error message indicating the upper limit of registration (S37) as shown in FIG. 16C, for example.

The controller 135 displays an error message (S36, S37) for a predetermined period, for example, and then ends the process of this flowchart and returns to step S4.

According to the favorite registering process described above, the favorite video mode desired by the user is registered in such a manner as to be easily called later (S35). In addition, by recording various setting values at the time of registration in the favorite table D6, the "video shooting area" and the like can be set to the setting values at the time of favorite registration when calling and using the favorite video mode.

2-2. Favorite Calling Process

A favorite calling process according to the present embodiment will be described with reference to FIGS. 17 and 18.

Figure 17:
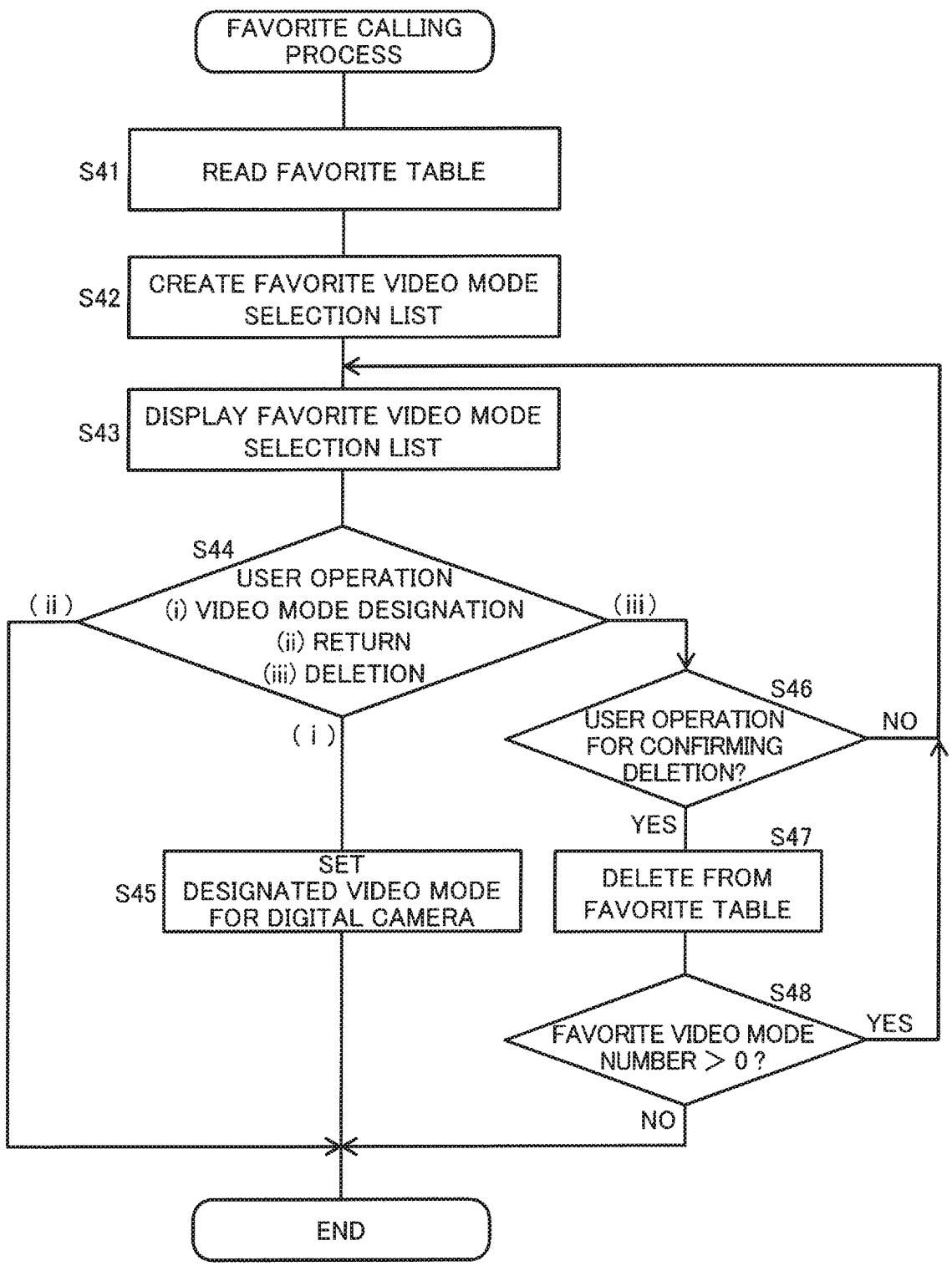
FIG. 17 is a flowchart showing a favorite calling process of the digital camera.

FIG. 17 is a flowchart showing an example of the favorite calling process. The process shown in the flowchart in FIG. 17 starts in response to an operation input by the user for selecting "call favorite video mode" via the setting menu screen in FIG. 13C, and is executed by the controller 135.

At first, the controller 135 reads information recorded in the favorite table D6 from the flash memory 145 (S41). The information to be read includes ID information indicating the favorite video mode, and various setting values at the time of registration, for example.

Subsequently, the controller 135 creates a favorite video mode selection list with reference to the video quality information D1a associated with the ID number which matches the read ID information in the video mode overall table D1 (S42). This selection list includes the video mode icon 50 corresponding to the favorite video mode in a configuration similar to the configuration of the selection list 5 of the first embodiment, for example.

Figure 18A:
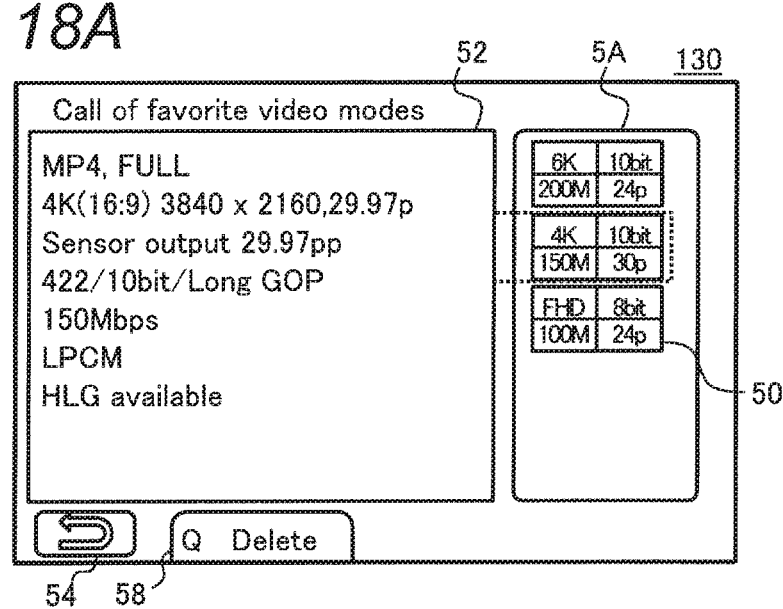
FIGS. 18A and 18B are diagrams each showing a display example of the favorite calling process.

The controller 135 controls the display monitor 130 to display the created favorite video mode selection list (S43). FIG. 18A shows a display example of step S43.

The controller 135 operates to be able to receive various operations from the user with a setting screen shown in FIG. 18A or the like being displayed (S44). The user operations to be received in step S44 include (i) a video mode designation operation, (ii) a return operation, and (iii) a deletion operation.

The video mode designation operation ((i) in S44) is performed in a manner similar to that of (ii) in step S4 in FIG. 8. The return operation ((ii) in S44) is performed in a manner similar to that of (iii) in step S4.

The deletion operation is a user operation to delete a specific favorite video mode selected by the user from the favorite video mode selection list. For example, the deletion operation is implemented as a touch operation for touching a deletion button 58 displayed on the display monitor 130 with the specific favorite video mode being selected. In addition to or instead of such a touch operation, the deletion operation may be implemented by an operation for pressing the press button 157, for example.

When the user inputs the video mode designation operation ((i) in S44), the controller 135 updates various setting information to set the video mode selected by the designation operation for the digital camera 100 (S45). At this time, the video quality is set with reference to the video mode overall table D1. In addition, the controller 135 overwrites setting values such as the "recording file format" and the "video shooting area" in accordance with information recorded in the favorite table D6.

When the favorite video mode is set for the digital camera 100 (S45), the controller 135 controls the display monitor 130 to return to the setting menu screen, and ends the process shown in this flowchart. When the user inputs the return operation ((ii) in S44), the controller 135 ends the process of this flowchart without particularly performing the processes of step S45 and others.

Figure 18B:
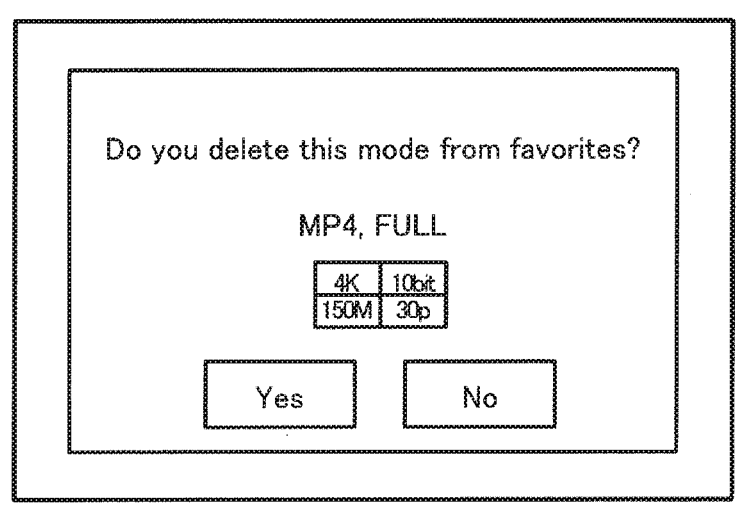

When the user inputs the deletion operation ((iii) in S44), the controller 135 causes the display monitor 130 to display a message for confirming deletion, and operates to be able to receive a user operation for determining whether to execute deletion (S46). FIG. 18B shows a display example of step S46. When the user operation for "No" of the present display example is input (NO in S46), the controller 135 returns to step S43.

On the other hand, when the user operation for "Yes" is input (YES in S46), the controller 135 deletes information associated with the ID information corresponding to the video mode selected by the deletion operation from the favorite table D6 (S47).

Subsequently, the controller 135 determines whether or not the number of the favorite video modes remaining in the favorite table D6 exceeds 0 (i.e., one or more) (S48). When one or more favorite video modes remain (YES in S48), the controller 135 executes again the processes of step S43 and subsequent steps.

On the other hand, when the number of the favorite video modes is 0 (NO in S48), the controller 135 ends the favorite calling process. In this case, the controller 135 displays the menu item "call favorite video mode" in grayout on the setting menu screen as shown in FIG. 13A.

According to the favorite calling process described above, the favorite video mode registered previously is selectively called, and allowed to be easily set for the digital camera 100. At this time, items other than the "video quality" are also switched automatically to those in the setting state for video shooting at the time of favorite registration, and thus the user can easily obtain a desired setting state of the digital camera 100.

3. Summary

As described above, the controller 135 included in the digital camera 100 of the present embodiment receives via the operation receiver 150 a favorite registration operation as a user operation for registering some of the video modes displayed on the display monitor 130 (see FIG. 13B), and records information indicating the registered video mode in the favorite list D6 of the flash memory 145 in accordance with the user operation for registering (S35). Accordingly, the user can register a desired video mode as favorite registration.

According to the present embodiment, the controller 135 receives via the operation receiver 150 a user operation for calling the registered video mode (see FIG. 13C), and causes the display monitor 130 to display a favorite video mode selection list 5A, which is an example of information indicating the registered video mode, in accordance with the user operation for calling. In this manner, the user can easily call the registered favorite video mode, and set the favorite video mode for the digital camera 100.

Other Embodiments

The first and second embodiments have been described above by way of example of the technology disclosed in the present application. However, the technology of the present disclosure is not limited to these embodiments, but is applicable to embodiments including changes, replacements, additions, omissions, and the like as appropriate. In addition, other embodiments may be practiced by combining the respective constituent elements described in the first and second embodiments. Accordingly, other embodiments will be presented hereinafter by way of example.

In the first embodiment described above, the video mode selection list 5 on the video quality setting screen is presented as a display example of subjects to be refined. However, display of the subjects to be refined is not particularly limited to this example. A modification of this point will be described with reference to FIGS. 19A and 19B.

Figure 19A:
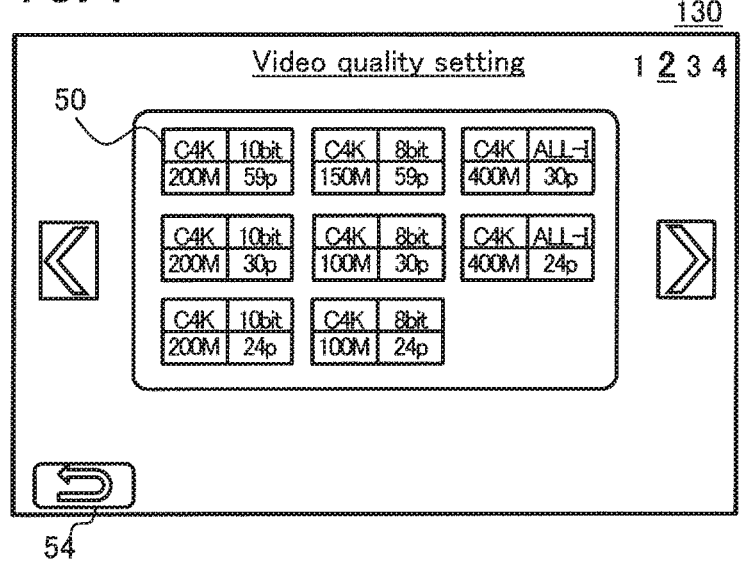
FIGS. 19A and 19B are diagrams each showing a modification of video mode display of the digital camera.
Figure 19B:
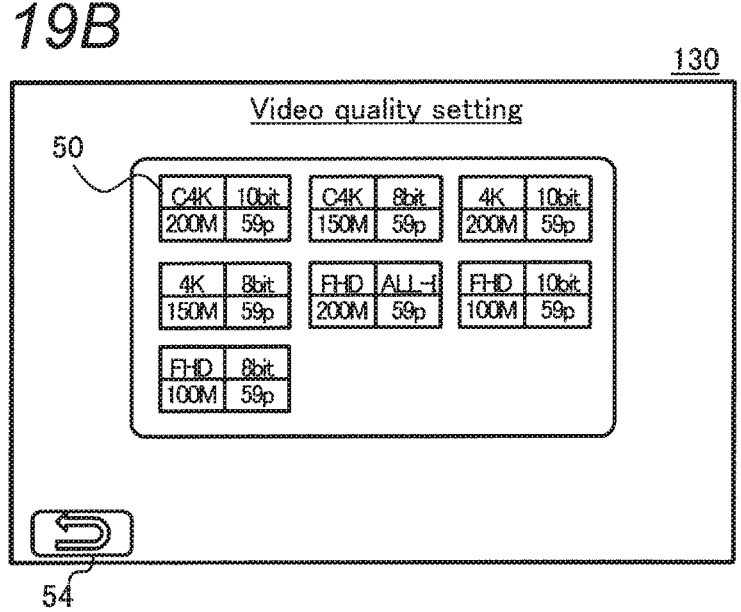

FIGS. 19A and 19B each show a display example of a video mode on a quick menu screen. The quick menu screen is displayed on the display monitor 130 in response to a pressing operation for pressing the predetermined press button 157 of the digital camera 100, for example.

FIG. 19A shows a quick menu screen before refining. Before refining, the controller 135 divides a plurality of the video mode icons 50 into pages based on a predetermined item such as the number of pixels, and causes the display monitor 130 to display the divided video mode icons 50. FIG. 19A shows a state where the video mode icon 50 indicating the number of pixels as "C4K" is displayed on a second page.

FIG. 19B shows a quick menu screen after refining. In this case, the number of the displayed video mode icons 50 is reduced in accordance with the refining condition. Accordingly, the controller 135 displays a list of the video mode icons 50 without particularly dividing the video mode icons 50 into pages in the manner described above. For example, when the press button 157 is pressed with any one of the condition values of the refining condition table D3 stored in the digital camera 100 being set to a value other than "all", the quick menu screen as shown in FIG. 19B is displayed.

While an example of the condition items and the condition values of the refining conditions has been described in the respective embodiments described above (see FIG. 5B), the refining conditions are not particularly limited to this example. Various condition items and condition values are adoptable. For example, a "YUV bit number", a "bit rate", a "recording file format", and the like may be used as condition items instead of external items. In addition, the "video shooting area" may be used as a condition item. For example, instead of the video shooting area check table D2, the item "video shooting area" may be managed in the video mode overall table D1.

While FIG. 4 shows an example in which the "video shooting area" is managed as an external item of the video mode, the external item is not particularly limited to this item. For example, the "compression method" or the like may be managed as an external item.

Whether or not the refining search function described above is available may be switched in accordance with a predetermined setting of the digital camera 100. For example, the presence or absence of the display of the refining button 53 or the like may be set such that the refining search function is available only when the recording file format is a specific setting value such as "MOV".

The second embodiment has described an example in which the favorite video mode is registered or deleted in the favorite table D6. In addition to or instead of this example, the favorite video mode may be updated such that a part of the data registered in the favorite table D6 is changed.

While the digital camera has been described as an example of the imaging apparatus in the respective embodiments described above, the present disclosure is not limited to this example. The imaging apparatus according to the present disclosure may be any electronic device having an imaging function (for example, a video camera, a smartphone, a tablet terminal, or the like).

The embodiments have been described by way of example of the technology of the present disclosure. The accompanying drawings and detailed description have been presented for this purpose.

Accordingly, some of the constituent elements described in the accompanying drawings and the detailed description may include not only essential constituent elements for solving the problem, but also constituent elements which are not essential for solving the problem, in order to illustrate the above technology. Therefore, it should not be immediately recognized that these non-essential components are imperative based on the fact that the non-essential components are described in the accompanying drawings and detailed description.

Further, since the above-described embodiments are for illustrating the technology in the present disclosure, various changes, substitutions, additions, omissions, and the like can be made within the scope of the claims or the equivalents thereof.

The present disclosure is applicable to an imaging apparatus having a plurality of video modes.

The invention claimed is:

1. An imaging apparatus having a plurality of video modes for capturing videos with respective video quality, the imaging apparatus comprising:
    a display that displays information indicating the plurality of video modes;
    an operation receiver that receives a user operation for designating a video mode in the plurality of video modes based on the information displayed on the display; and
    a controller that sets the video mode designated via the operation receiver for the imaging apparatus,
    wherein each of the video modes has a plurality of elements corresponding to a plurality of items associated with the video quality, and combinations of the elements of different items are limited in the plurality of video modes,
    wherein the controller
    receives, via the operation receiver, a user operation for setting a refining condition with respect to each of at least two of the plurality of items, and
    refines, from the plurality of video modes, a video mode to be displayed on the display in accordance with the set refining condition.

2. The imaging apparatus according to claim 1, wherein the refining condition specifies an element with respect to each of the at least two of the plurality of items, and
    the controller refines the video mode to be displayed on the display into a video mode having the specified elements in accordance with the refining condition.

3. The imaging apparatus according to claim 1, wherein the controller causes the display to display the number of the video modes meeting the refining condition in the plurality of video modes in accordance with the setting of the refining condition via the operation receiver.

4. The imaging apparatus according to claim 1, wherein, when the video mode designated via the operation receiver is unavailable in a state preset for the imaging apparatus, the controller causes the display to display information indicating that the designated video mode is unavailable in the preset state.

5. The imaging apparatus according to claim 1, further comprising a memory that stores information for managing the plurality of video modes within a range where combinations of the elements of the different items are limited.

6. The imaging apparatus according to claim 5, wherein the controller
    receives, via the operation receiver, a user operation for registering a video mode in the video modes displayed on the display, and
    records information indicating the registered video mode in the memory in accordance with the user operation for registering.

7. The imaging apparatus according to claim 6, wherein the controller
    receives, via the operation receiver, an operation for calling the registered video mode, and causes the display to display information indicating the registered video mode in accordance with the user operation for calling.

8. The imaging apparatus according to claim 1, wherein the plurality of items associated with the video quality include at least one of a frame rate, a number of pixels, a compression method, and availability of a predetermined additional function of the video.

9. The imaging apparatus according to claim 1, wherein the controller
receives, via the operation receiver, the user operation for setting the refining condition, the user operation including user designation of a corresponding element for each of the at least two of the items among the plurality of items, respectively, and
refines, from the plurality of video modes, a video mode to be displayed on the display in accordance with the set refining condition by simultaneously limiting which video modes among the plurality of video modes are displayed on the display based on each of the respective corresponding elements designated by the user.

* * * * *